(12) United States Patent
Morrison

(10) Patent No.: US 6,798,956 B2
(45) Date of Patent: Sep. 28, 2004

(54) OPTICAL CABLE WITH INDICATOR

(75) Inventor: John M. Morrison, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 95 days.

(21) Appl. No.: 10/197,509

(22) Filed: Jul. 16, 2002

(65) Prior Publication Data

US 2004/0146254 A1 Jul. 29, 2004

(51) Int. Cl.[7] .................................................. G02B 6/44
(52) U.S. Cl. ................................... 385/100; 385/13
(58) Field of Search ................................ 385/100, 101, 385/106, 112, 147, 125, 128, 12, 13; 174/47, 8, 11 R, 25 R; 250/227.15, 227.16; 73/800

(56) References Cited

U.S. PATENT DOCUMENTS

| | | | |
|---|---|---|---|
| 4,623,218 A | * 11/1986 | Laurette et al. | ............. 385/101 |
| 4,814,949 A | 3/1989 | Elliott | |
| 5,223,310 A | * 6/1993 | Singh et al. | ............... 428/1.31 |
| 5,348,690 A | 9/1994 | Cohen et al. | |
| 5,446,629 A | 8/1995 | Steiger et al. | |
| 6,108,475 A | * 8/2000 | Chapin et al. | .............. 385/128 |
| 6,336,729 B1 | 1/2002 | Pavelle et al. | |
| 6,442,316 B1 | * 8/2002 | Rossi et al. | ................. 385/106 |
| 6,461,543 B2 | 10/2002 | Earl | |

FOREIGN PATENT DOCUMENTS

JP         10-294001 A  * 11/1998

* cited by examiner

*Primary Examiner*—Akm Enayet Ullah
*Assistant Examiner*—Mike Stahl
(74) *Attorney, Agent, or Firm*—Robert C. Kowert; Meyertons, Hood, Kivlin, Kowert & Goetzel, P.C.

(57) ABSTRACT

Networks may include optical cables to transmit data between various devices in the network. Indicators positioned on or within optical cables may be used to identify cables that have been compromised during installation, movement and/or use of the cables. Indicators may reduce a network downtime by decreasing the time needed to identify compromised cables. In some embodiments, indicators may change color and/or emit light to indicate that an optical cable has been compromised.

22 Claims, 8 Drawing Sheets

OPTICAL CABLE WITH INDICATOR

BACKGROUND

1. Field of the Invention

This invention relates to the field of optical cables, and more particularly to identifying failed, compromised or damaged optical cables.

2. Description of Related Art

Networks and/or computer systems rely on various types of cables to transmit data between components. Cables used in such systems may include, but are not limited to optical cables and/or copper cables. Optical cables may increase transmission rates between components. In some embodiments, a transmission rate of an optical cable may be greater than about a gigabit per second. Optical cables may also be used in other fields such as telecommunications (e.g., phone lines, cable lines), medical imaging (e.g., endoscopes, laparoscopes, and/or bronchoscopes), mechanical imaging (e.g., inspecting mechanical welds), and/or plumbing.

Optical cables may include a core of optical fibers. Optical fibers may include long, thin strands of relatively pure glass. The thickness of the glass may be equal to about the thickness of human hair. Cladding and/or housings may be used to inhibit damage to the optical fibers from various external elements including, but not limited to, moisture, loads, and/or stress due to bending. For example, during installation, use, and/or movement, cables may be compromised due to stress induced by bending the cable. Transmission of data through a compromised cable may be inhibited or may fail. For example, a compromised cable may have been clamped, constrained or bent to the point where the surface or core of an optical fiber has split or cracked. Even a cut or nick on the surface of an optical fiber or a hairline crack may lead to transmission errors.

Quick and accurate troubleshooting of compromised cables may minimize transmission delays or loss. Many challenges are presented during troubleshooting of compromised fiber optic cables. For example, cables may lack any visual identification of having been compromised. In many systems, multiple fiber optic cables may be routed together. Identifying the compromised cable may involve replacing cables one at a time. Testing may be performed after cable changes to ensure proper installation. In many instances, one or more cables may be replaced and tested before a compromised cable is identified. Thus, cables that are functioning properly may needlessly be replaced and tested. The cost of rework or replacement is often significant.

SUMMARY

In an embodiment, optical cables may include an indicator that is activated when a portion of the optical fiber is compromised. For example, the optical cable may be compromised if a portion of the cable bends beyond a maximum bend radius of the cable. In some embodiments, the indicator may include two conduits, one positioned within the other. Each conduit may contain a fluid. Bending the cable beyond the maximum bend radius may allow the fluids to mix, thereby activating the indicator. The indicator may consist of a color change within the fluids and/or the emission of light from the fluids.

An embodiment may include a plurality of cables having indicators coupled to two or more devices within a network. If a cable within the network is compromised then it can be identified by the activation of the indicator. For example, color change and/or emission of light within the cable may allow for identification of the compromised cable.

In one embodiment, a cable system may include an optical fiber having a maximum bend radius and an indicator coupled to the optical fiber. The indicator may be activated after a portion of the optical fiber has exceeded the maximum bend radius of the optical fiber. In one embodiment, a cable system including an optical fiber may have a first conduit having a first fluid coupled to the optical fiber and a second conduit having a second fluid. The second conduit may be postionable within the first conduit and allow the first fluid and the second fluid to mix if a portion of the optical fiber has been compromised.

In one embodiment, a network system may include one or more cables. One of the one or more cables may include a first conduit containing a first fluid, a second conduit containing a second fluid and an indicator configured to be activated if a portion of the cable is compromised. The network system may include at least two network devices. One of the network devices may be coupled to another using the cable.

In one embodiment, a method may include monitoring a network system that connects components via a plurality of optical cables, each optical cable including a respective indicator. Each indicator may be configured to be activated if a portion of its respective cable is compromised. The method may include detecting a transmission error within the network system and locating one or more of the optical cables having an activated indicator. The one or more of the optical cables having an activated indicator may be replaced.

The embodiments described above include optical cables. Some embodiments may include copper or other types of cables as a transmission media. A copper cable, multi-fiber copper cable, or other type of cable may include an indicator that activates if the cable is compromised. In some embodiments, the indicator may change color and/or emit light.

Figure 1:
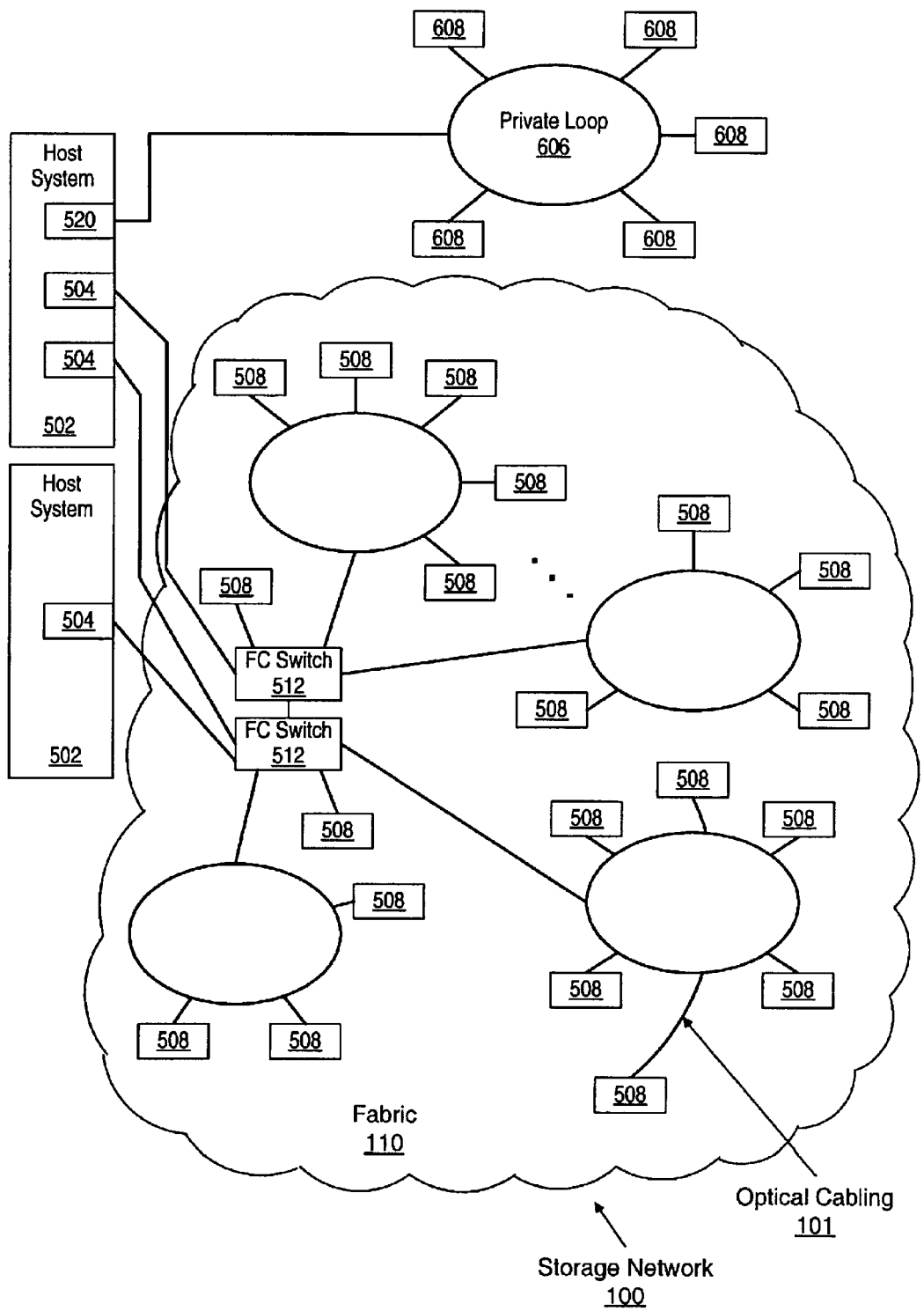
FIG. 1 illustrates one embodiment of optical cables as physical transmission media for a storage network.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates an exemplary embodiment of storage network 100 interconnecting a direct attached private loop 606 and a fabric 510 via optical cables 101. Storage network 100 may include one or more hosts 502 connected to one or more storage devices 508 and 608 via optical cables 101. The storage network 100 may be configured in a variety of different ways and may include one or more direct attach devices, storage area networks (SANs), and/or network attach devices (NAS). Storage network 100 may include fibre channel technologies layered over optical cables 101 with optical cables 101 as physical transmission media. The storage network 100 may not be limited to fibre channel technologies and architectures but may include various types of technologies layered over optical cables 101. For example, some of storage network 100 may be based on the InfiniBand™ architecture or Small Computer System Interface over IP (iSCSI). The storage network 100 may include various types of topologies (e.g., geometric arrangements of components in the network) and protocols (e.g., rules and encoding specifications for sending data).

In some embodiments, a plurality of hosts may communicate with a plurality of storage devices via one or more host adapters 520 and 504. Coupled to private loop 606 are one or more direct attach devices 608 (e.g., devices local to a host). Fabric 510 may include fibre channel switches 512 which are coupled to multiple fabric devices 508 via optical cables. Fabric devices 508 and 608 may be various storage devices such as storage systems, hard disk drives, optical drives, tape drives, etc. Each fibre channel switch 512 may connect to various fibre channel topologies via optical cables 101 such as point-to-point fibre channel connections or loops. Each switch 512 may also connect to one or more other fibre channel switches via optical cables 101.

Figure 2:
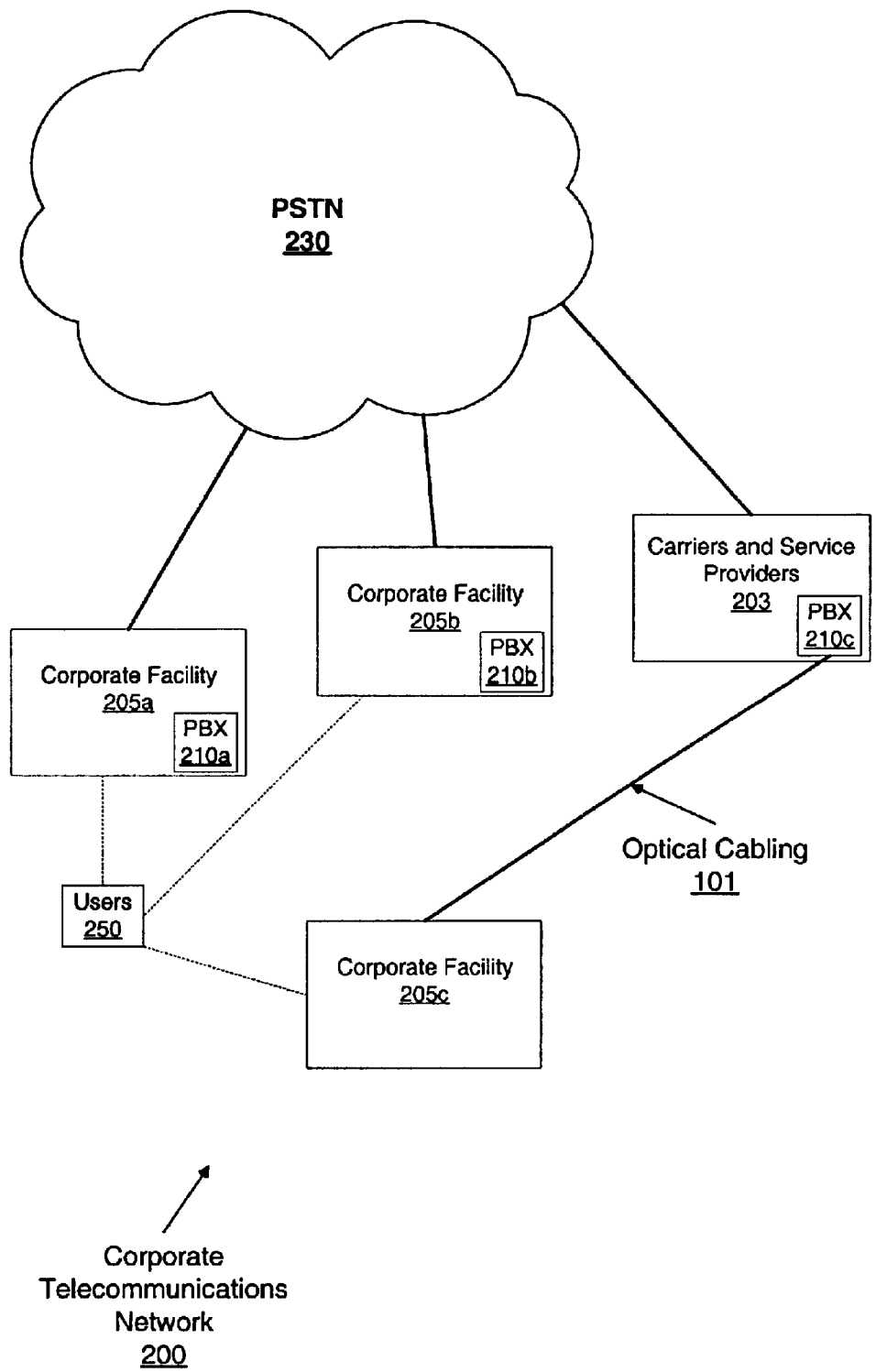
FIG. 2 illustrates one embodiment of optical cables as physical transmission media for a telecommunications network.

FIG. 2 illustrates another embodiment of optical cables 101 connecting corporate telecommunications network 100 as an extension of PSTN (public switched telephone network) 230. Network 100 may provide transmission of sound, data, facsimiles, pictures, voice, video, and other information between a plurality of corporate users 250 via optical cables 101. A number of carriers and service providers 203 may provide various types of services to users. Carriers and service providers 203 may include ILECs (incumbent local exchange carriers), IXCs (interexchange carriers), CAPs (competitive access providers), CLECS (competitive LECs), ISPs (internet service providers), ICPs (integrated communications providers), or other entities that provide telecommunication services to users. Carriers and service providers 203 may provide such services over optical cables 101 as physical transmission media.

A corporation may set up a public branch exchange (PBX) 210 as an extension of services provided by PSTN 230. For example, a PBX 210a may be set up at a corporate facility 205 to accept calls for corporate users 250 routed from the PSTN. The PBX 201a may then distribute the calls to the corporate users 250. Alternatively, a carrier 203 may maintain a PBX 210c (e.g., Centrex) at the carrier facility 203 to provide routing service to a corporation. Network 200 may include one or more PBX 210 providing services to the plurality of corporate users 250. Optical cables may be used in any or all stages of telecommunications network 200.

Some embodiments of storage network 100 and corporate telecommunications network 200 may include other types of components than those shown in FIGS. 1 and 2. For example, some hosts within storage network 100 may include other components such as application software, other CPUs, video monitors, or other types of devices for use by hosts within storage system 100. In addition, optical cables 101 may be used in a variety of networks. Optical cables 101 may also be used in a variety of fields. For example, optical cables 101 may be used for imaging. The number of components, types of components and systems of use are for illustration purposes of the types of systems in which one or more optical cables including an indicator(s) as described below may be employed.

Figure 3:
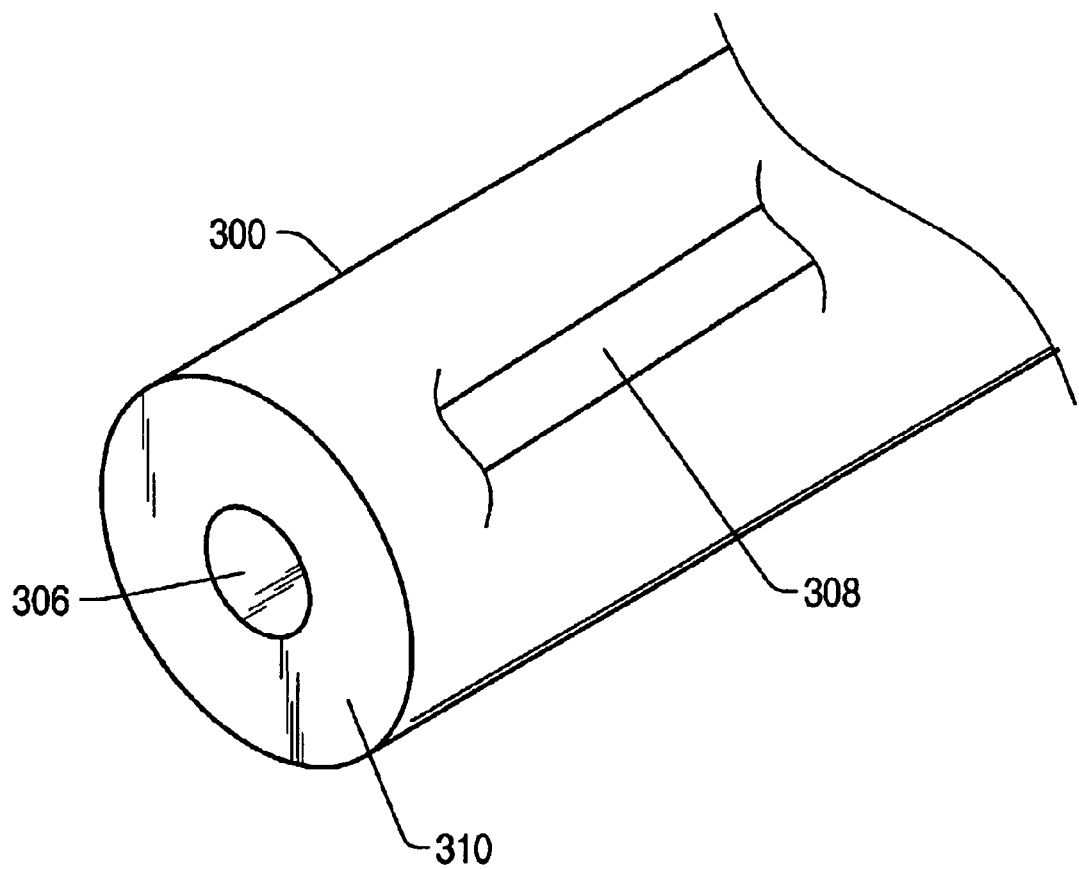
FIG. 3 illustrates an optical cable including an indicator that may activate if the optical cable is compromised, according to one embodiment.

FIG. 3 illustrates one embodiment of an optical cable 101 including or coupled to an indicator 308. Optical cable 101 may include optical fiber 306 protected by cladding 310. Depending on the use of optical cable 101, optical cable 101 may include various materials and types of optical fiber 306. For example, optical fiber 306 may be further protected within a tight, soft plastic buffer. Optical fiber 306 may include one layer of glass or many layers of glass. Construction and types of optical cable 101 may vary.

Optical cable 101 may be sensitive to physical constraint placed on the cable. For example, bending a portion of optical cable 101 beyond a certain radius may damage optical fiber 306. In some instances, low environmental temperatures or other thermal stress may induce microbends which are small-scale distortions on the surface of optical fibers. For example, protective material may contract more than glass and the protective material may become rigid and bend. Consequently, enough load (e.g., physical pressure) may be exerted on optical fiber 306 to cause microbends. Manufacturers may specify bend diameters, critical angles, bend radius, or some other constraint parameter that indicates a bend allowance for optical fibers within a type of optical cable 101.

Indicator 308 may be part of or coupled to optical cable 101 to visibly identify a transmission error or problem with optical cable 101. Indicator 308 may activate if optical cable 101 is compromised (e.g., bent beyond a specified bend radius or otherwise damaged). Indicator 308 may activate after a portion of the optical fiber 306 is compromised. Activation of indicator 308 may include a visible identifier that optical fiber 306 is compromised.

Figure 4:
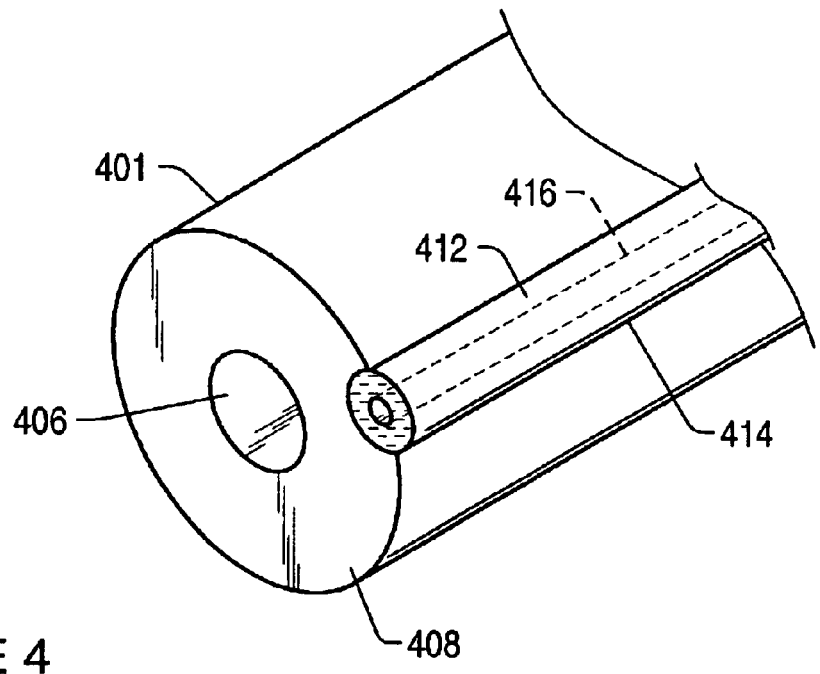
FIG. 4 illustrates an optical cable including an indicator that changes color and/or emits light if the optical cable is compromised, according to one embodiment.

FIG. 4 illustrates one embodiment of an optical cable 401 including an indicator 412 that activates when a portion of optical fiber 406 is compromised. Indicator 412 may include conduit 414 and conduit 416. Conduits may extend the length of the optical cable 401. In alternative embodiments, conduits may extend for one or more segments of the length of the optical cable 401. Conduits 414 and 416 may have a circular, oval, rectilinear, and/or irregular cross-sectional areas. Conduit 416 may be positioned within conduit 414. In some embodiments, conduits 414 and 416 may be concentric. In some embodiments, movement of conduit 416 relative to conduit 414 may be inhibited. For example, spacers and/or centralizers may be used to inhibit the movement of conduit 416. In other embodiments, conduit 416 or a portion thereof may be free to move within conduit 414.

In one embodiment, a wall of conduit 414 may form a portion of the wall of cladding 408. In some embodiments, the wall of conduit 414 may be translucent and/or transparent. In an embodiment, a portion of the wall of the first conduit acting as the wall of the cladding may be translucent and/or transparent.

In one embodiment, conduit 414 may be relatively flexible. For example, conduit 414 may. have flexibility similar to cladding 408. In further embodiments, conduit 416 may be constructed to have mechanical strength properties (e.g., maximum bend radius, compression strength, etc.) similar to strength properties of optical fiber 406. Load and/or stresses that may compromise optical fiber 406 may activate indicator 412. For example, conduit 416 may have a maximum bend radius similar to about the maximum bend radius of the optical fiber 406. In such embodiments, bending optical cable 401 beyond the maximum bend radius activates the indicator 412. In some embodiments, conduit 416 may have a maximum bend radius that is less than about a maximum bend radius of the optical fiber 406. In addition, conduit 416 may have a compressive strength equal to or less than about a compressive strength of optical fiber 406.

In some embodiments, conduit 414 may contain a fluid and conduit 416 may contain a fluid. If conduit 416 is compromised, fluid may flow out of conduit 416 into conduit 414 and mix with fluid in conduit 414. Mixing of the fluids may cause a color change within the indicator 412. In one embodiment, a component of at least one of the fluids may be a dye. Alternatively, a component may be a fluorescent dye. In certain embodiments, conduit 416 may be opaque. For example, dye may be present in opaque conduit 416. As the optical cable 401 is stressed to a point at which the optical fiber 406 is compromised, a portion of the inner opaque conduit is also compromised allowing the dye to mix with fluid in conduit 414. Thus, a color is altered in conduit 414. In other embodiments, conduit 416 may be transparent or translucent.

Mixing of the fluids may cause a chemical reaction that generates light and/or a color change in the indicator 412. The mixing of the fluids may cause components in the mixture to emit light. In some embodiments, a component in one of the fluids may convert to a luminescent species after the fluids in conduit 414 and conduit 416 mix. For example, luminol may decompose in the presence of an activator (e.g., oxidants) to a compound (e.g., 3-aminophthalate) that may luminesce. In certain embodiments, a catalyst may also be present in the fluids. For example, a salicylate catalyst may be used.

In one embodiment, a component of a fluid in conduit 414 may include an emitting species and/or a precursor of an emitting species. Precursors may include, but are not limited to, peroxyoxalates, phenyl oxalate ester, bis(2,4,6-trichlorophenyl) oxalate (TCPO), oxalyl chloride, oxalic phthalate ester, and/or luminol. In such embodiments, an activator (e.g., peroxides, hydrogen peroxide, perborate, permanganate, hypochlorite, iodine and/or mixtures thereof) may be present in conduit 416. Mixing of an activator with fluid from conduit 414 may cause conversion of a precursor to an emitting species. In some embodiments, fluid in conduit 414 may also include a fluorophore. A fluorophore is generally defined as a dye capable of fluorescence. Examples of fluorophores may include, but may not be limited to, 5,6,11,12-tetraphenylnapthacene, 9,10-diphenylanthracene and/or 9,10-bis (phenylethynyl) anthracene.

Optical cable 401 may bend such that conduit 416 ruptures within conduit 414. Fluids present within conduit 416 may include a precursor such as oxalic phthalate. Oxalic phthalate may react with an activator (e.g., hydrogen peroxide) present in conduit 414 to form a dioxetanedione intermediate. This dioxetanedione intermediate may decompose to phenol and carbon while emitting energy. The energy may excite a fluorophore in the fluids that then releases light.

In other embodiments, fluids present in conduit 414 may include an activator and fluids present in conduit 416 may include an emitting species and/or a precursor to an emitting species. In addition, fluorophores may be present in conduit 414 and/or conduit 416.

In some embodiments, components in the fluids may be sensitive to light. In such instances, UV absorbers may be present in the fluids in the conduits to reduce decomposition of components prior to activation. In some embodiments, fluids may contain radical inhibitors to inhibit decomposition of components in the fluids. For example, an activator such as hydrogen peroxide in conduit 416 may decompose when exposed to light. UV absorbers may be present in the fluid in conduit 414 to absorb light prior to reaching conduit 416. Alternatively, conduits 414 and 416 may be constructed (e.g., conduit 416 may be opaque and/or contain UV absorbers) to inhibit light from reaching fluid in conduit 416. In some instances, UV absorbers may be selected that absorb light outside of the range of the fluorophore and/or the luminescent species.

In one embodiment, conduits 414 and 416 may include fluids that are alkaline, acidic and/or pH indicators. For example, conduit 416 may contain a pH indicator that will change color when the pH of the surrounding fluid is changed. If the maximum bend radius is exceeded, conduit 416 may be compromised allowing the pH indicator in conduit 416 to mix with fluid in conduit 414. Fluids within conduits 414 and 416 may have significantly different pH values allowing the pH indicator to change color when the fluids mix. In alternative embodiments, fluids in conduit 414 may include a pH indicator.

The above description of indicator activation, fluids, etc. may apply to any of the embodiments described herein.

Figure 5:
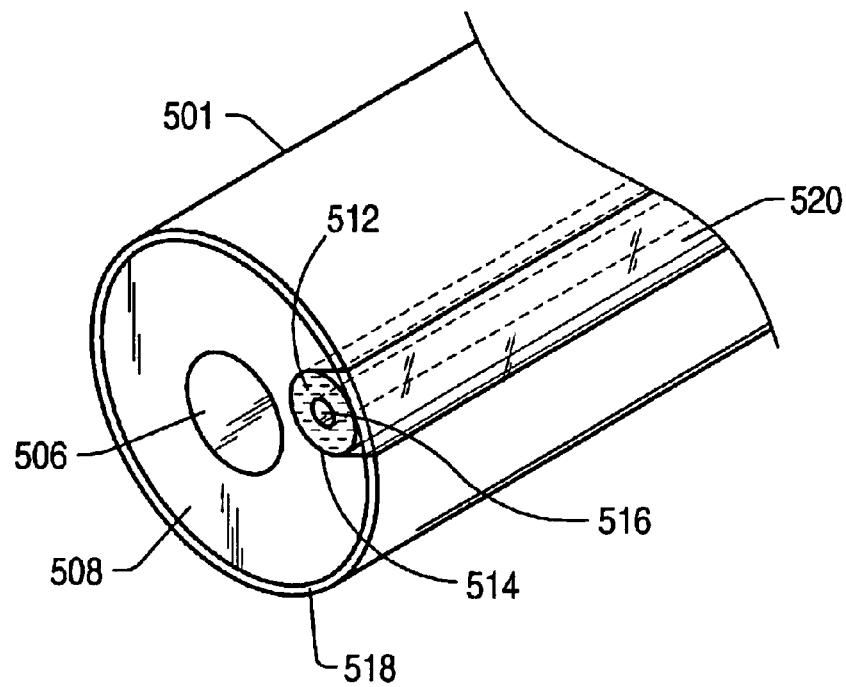
FIG. 5 illustrates an optical cable including an indicator positioned within cladding that changes color and/or emits light visible through a window if the optical cable is compromised, according to one embodiment.

FIG. 5 illustrates another embodiment of an optical cable 501 having indicator 512 positioned within cladding 508. Exterior cladding 518 surrounds cladding 508 and indicator 512. Exterior cladding 518 may include a window 520 positioned proximate to indicator 512. Window 520 may be translucent and/or transparent. In some embodiments, window 520 may be flexible. Window 520 may allow visualization of indicator 512 to identify which cable has been compromised.

Figure 6:
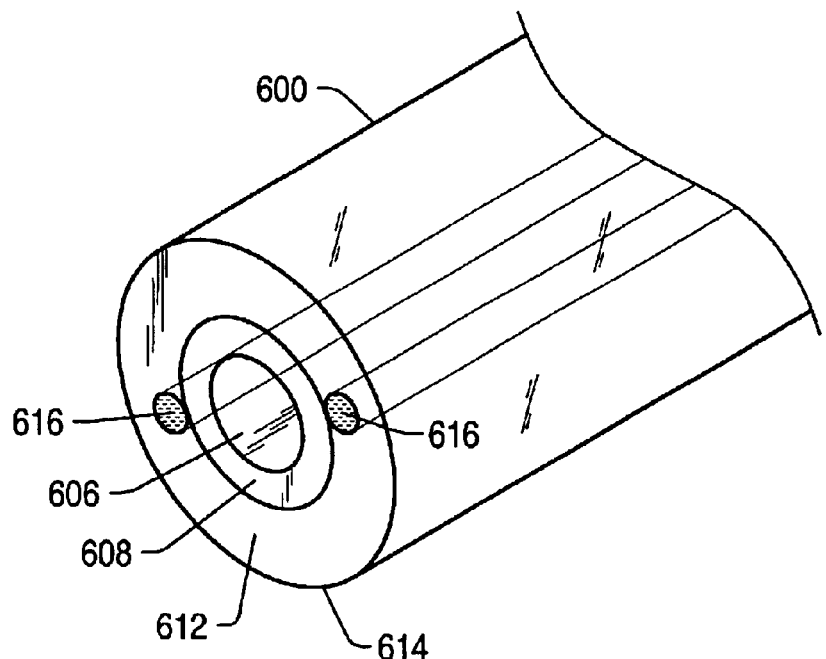
FIG. 6 illustrates an optical cable including a multi-conduit indicator that changes color and/or emits light if the optical cable is compromised, according to one embodiment.

As illustrated in FIG. 6, another embodiment of an optical cable 601 may include indicator 612 surrounding cladding 608. Conduits 616 may be positioned proximate cladding 608. Conduit 614 may surround conduits 616 and cladding 608. In addition, conduit 614 may serve as an exterior cladding for optical cable 601. Alternatively, in some embodiments an additional exterior cladding may surround conduit 614. Other embodiments may include three or more conduits 616.

Figure 7:
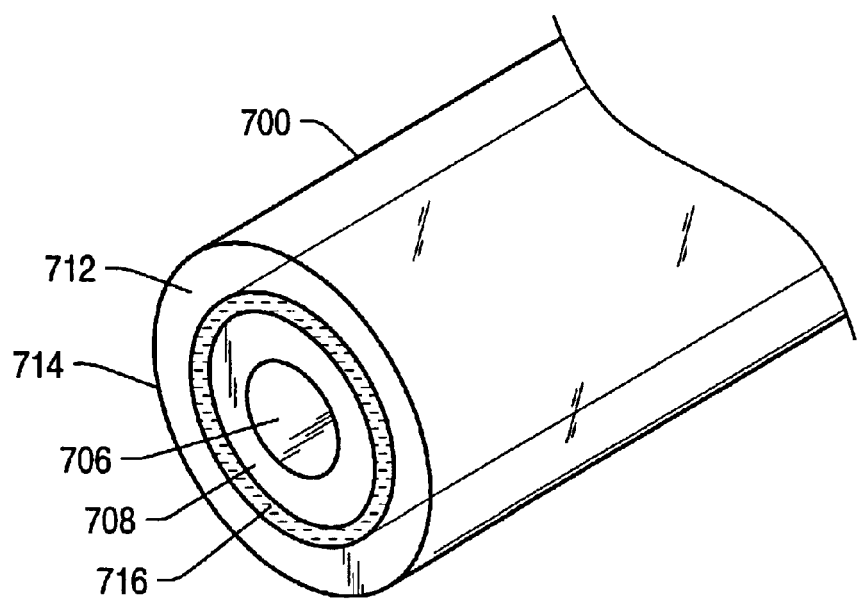
FIG. 7 illustrates an optical cable including an indicator that surrounds cladding and optical fiber and the indicator changes color and/or emits light if the optical cable is compromised, according to one embodiment.

FIG. 7 illustrates another embodiment of optical cable 701 with indicator 712 surrounding cladding 708 and optical fiber 706. Conduit 716 may be positioned such that it surrounds cladding 708. Fluid may be contained in conduit 716 between a wall of conduit 716 and cladding 708. Conduit 714 may surround conduit 716 as shown.

Figure 8:
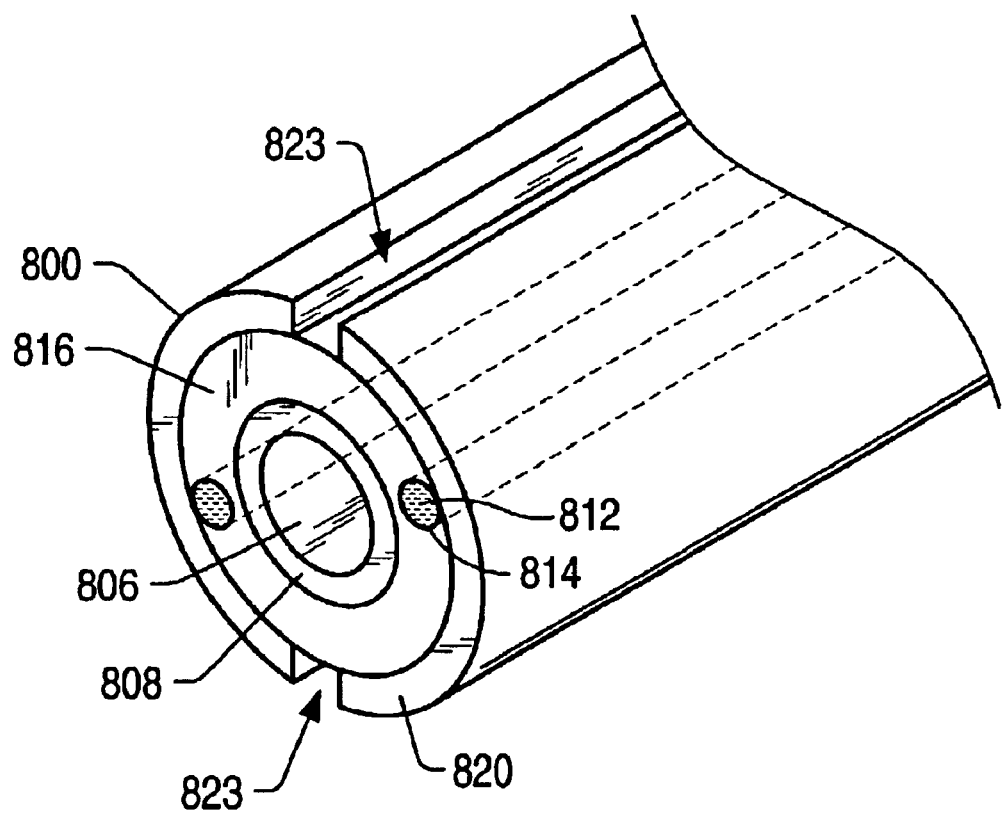
FIG. 8 illustrates an optical cable including an indicator with an opaque exterior cladding and the indicator changes color and/or emits light if the optical cable is compromised, according to one embodiment.

In some embodiments, a portion of a conduit may be opaque to inhibit absorption of light within fluids. Absorption of light within the fluids may inhibit decomposition of components in the fluids prior to activation of an indicator. FIG. 8 illustrates an alternative embodiment having exterior cladding 820 surrounding conduit 814 and positioned proximate conduit 816 to inhibit decomposition of any fluids 812 (e.g., an activator). Cladding 820 may be substantially opaque to inhibit decomposition of the fluids. Cladding 820 may include one or more gaps 823 to allow visual access to a portion of conduit 816 for observation. Alternatively, a window may be positioned over conduit 816. Gaps and/or windows may be positioned to inhibit light from reaching fluids in conduits 814.

Optical cables as described in the above embodiments may be arranged in various configurations. Various cable configurations may exist, including those with multiple cables in a larger outer jacket or hybrid cables with optical fiber and copper cables in a same assembly. Most multi-fiber cables have optical fibers arranged in a circular cross-section. However, ribbon style cables may be used to maximize cable density for some applications. Other optical fiber cables may be arranged in different configurations.

Figure 9:
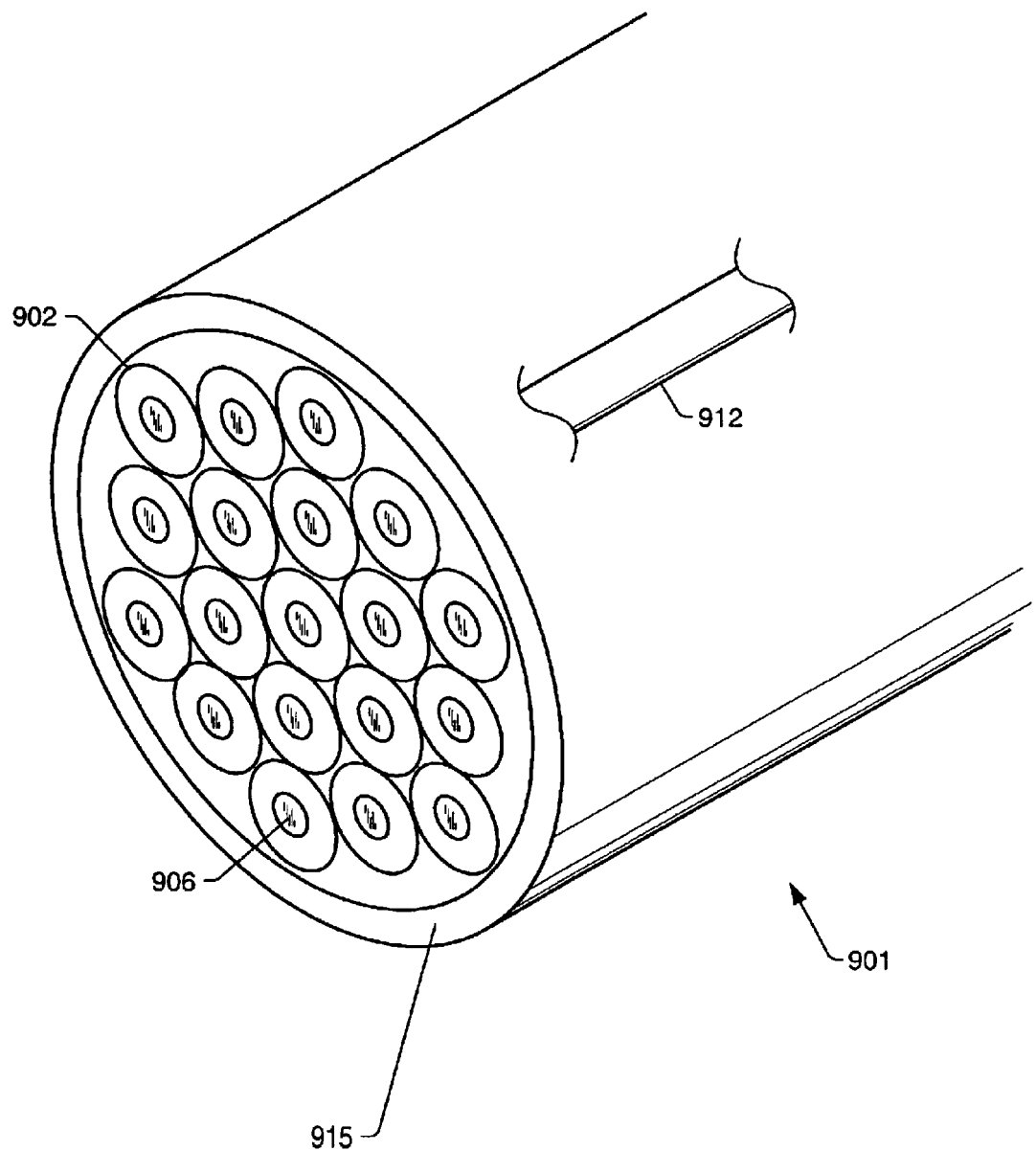
FIG. 9 illustrates a multi-fiber optical cable that includes an indicator, according to one embodiment.

FIG. 9 illustrates a cross-section of one embodiment of a multi-fiber optical cable 901 that includes a plurality of optical cables 902. An indicator 912 may be coupled to the multi-fiber optical cable 902. The plurality of optical cables 902 may be arranged in a circular configuration enclosed by a bonding material 915. Each optical cable 902 may include optical fiber 906. The indicator 912 may be connected to the bonding material 915. In one embodiment, bonding material 915 may be an outer jacket, a bonding matrix, or other material suitable for enclosing or bundling a plurality of optical cables 902. The number and types of optical cable 902 are for illustration purposes. The actual number and types of optical cable 902 may vary.

In one embodiment, indicator 912 may include an inner conduit within an outer conduit. In one embodiment, the inner conduit may be constructed to have mechanical strength properties (e.g., maximum bend radius, compression strength, etc.) similar to strength properties of optical fibers 906 within multi-fiber cable 902. Note that for multi-fiber or bundled cables, the mechanical strength properties may be different than for individual cables and the indicator may be configured accordingly. Load and/or stresses that may compromise optical fibers 906 within multi-fiber cable 902 may activate indicator 912. For example, the inner conduit may have a maximum bend radius similar to about the maximum bend radius of the bundled optical fibers 906 within multi-fiber cable 902. In such embodiments, bending multi-fiber optical cable 902 beyond the maximum bend radius activates the indicator 912. In some embodiments, the inner conduit may have a maximum bend radius that is less than about a maximum bend radius of the optical fibers 906 within multi-fiber cable 902. In addition, the inner conduit may have a compressive strength equal to about a compressive strength of optical fibers 906 within multi-fiber cable 902.

The indicator 912 may activate indicating that one or more optical fibers 906 within multi-fiber cable 902 may have been compromised. In some embodiments, the indicator 912 may change color and/or emit light. The outer conduit may contain a dye and the inner conduit may contain a fluid. As the multi-fiber optical cable 902 is stressed to a point at which one or more optical fibers 906 are compromised, a portion of the inner conduit is also compromised allowing the dye to mix with the fluid in the inner conduit. Thus, a color is altered in the inner conduit indicating a transmission problem has been detected within one or more optical fibers 906 within multi-fiber cable 902. The indicator 912 may be constructed similar to one of the embodiments described above.

Figure 10:
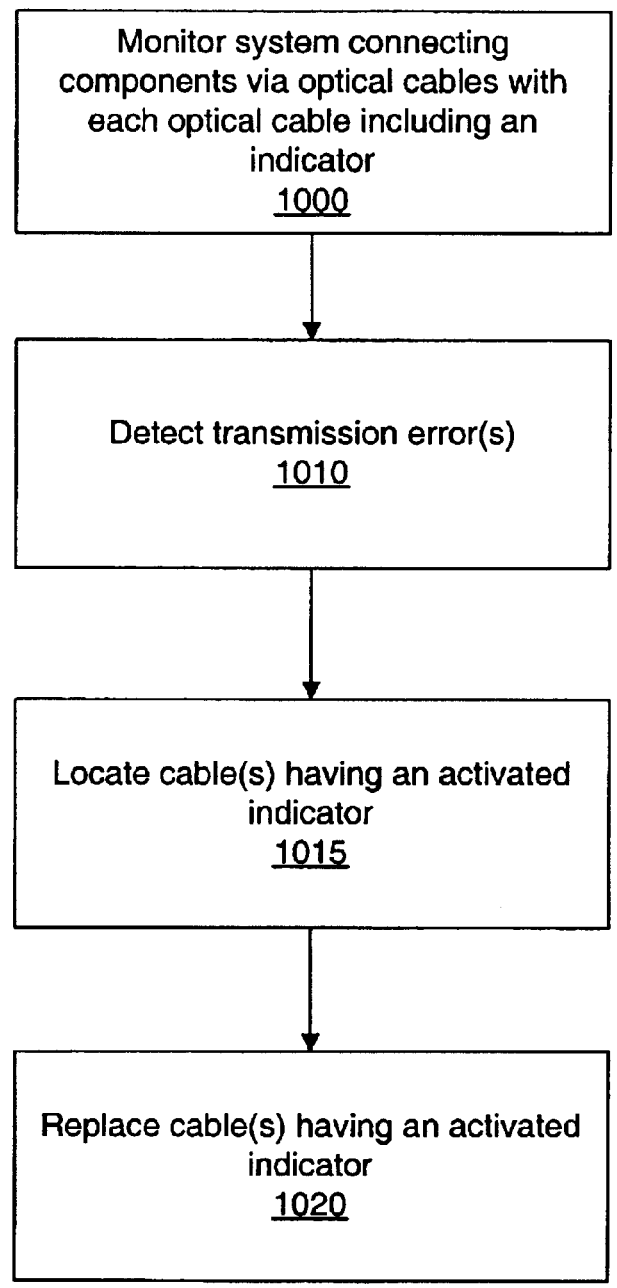
FIG. 10 illustrates a method for using optical cables that include a respective indicator(s), according to one embodiment.

FIG. 10 illustrates one embodiment of a method for using optical cables that include an indicator(s) as described above. A system may be monitored to check for transmission errors within the system, as indicated in 1000. For example, a storage network may be monitored to check for transmission errors within the storage network. The storage network may include one or more hosts connected to one or more storage devices via optical cables. The method may also be applied to other types of systems, such as telecommunication systems, that connect components via optical cables. The optical cables may include single optical cables and/or multi-fiber optical cables. Each optical cable or multi-fiber optical cable may include an indicator as described herein.

A transmission error may be detected within the system, as indicated in 1010. For example, an optical cable may have been compromised because the optical cable was bent beyond a specified bend radius and the excessive bending induces a transmission error. An indicator connected to the optical cable may activate when the optical cable is compromised. The indicator may activate when a portion of optical fiber within the optical cable is compromised. Activation of the indicator may show that an optical fiber within the optical cable is or may have been compromised. In one embodiment, the indicator may change color and/or emit light.

A field technician, for example, may locate one or more optical cables having an indicator activated, as indicated in 1015. The indicator may be part of or coupled to the optical cable to visibly identify a transmission error or problem with the optical cable. Thus, while searching for a source of a detected transmission error, the field technician may notice one or more optical cables having an indicator activated. The field technician may replace each compromised cable that has an indicator activated, as indicated in 1020.

The embodiments described above include optical fibers as a transmission media. Other embodiments may include other types of transmission media, such as copper wires in addition to or instead of optical fiber. For example, the transmission media may include copper wires surrounded by an insulator, twisted-pair cable consisting of copper-core wires surrounded by an insulator, and/or coaxial cable consisting of solid copper core surrounded by an insulator. An indicator as described above may be included with any type of transmission media. Copper or other types of cables may be arranged as bundled cables that include a plurality of cables as shown in FIG. 9. A copper wire cable, bundled wire cable, or other type of cable may include an indicator that activates if the cable is compromised, as described above. The indicator may be configured to activate under physical stress conditions approximating those that would damage the transmission media in the cable. The physical stress conditions may include one or more of stretching, bending, compression, twisting, etc. In some embodiments, the indicator may change color and/or emit light.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A cable comprising:
    an optical fiber having a maximum bend radius;
    an indicator coupled to the optical fiber; and
    wherein the indicator is activated if a portion of the optical fiber has exceeded the maximum bend radius of the optical fiber;
    wherein the indicator comprises:
        a first conduit comprising a first fluid; and
        a second conduit comprising a second fluid, wherein the first fluid and the second fluid are allowed to mix after the maximum bend radius of the optical fiber has been exceeded.

2. The system as recited in claim 1, further comprising cladding surrounding the optical fiber, wherein at least a portion of the first conduit is positioned in the cladding and wherein at least a portion of the first conduit forms a section of a wall of the cladding.

3. The system as recited in claim 1, wherein the mixing of the first fluid and the second fluid alters a color in the first conduit.

4. The system as recited in claim 1, further comprising cladding, and wherein the first conduit surrounds at least a portion of the cladding.

5. The system as recited in claim 1, wherein at least a portion of the first conduit is translucent.

6. A cable comprising:
    an optical fiber having a maximum bend radius;
    an indicator coupled to the optical fiber; and
    wherein the indicator is activated if a portion of the optical fiber has exceeded the maximum bend radius of the optical fiber;
    wherein the indicator comprises a first cladding proximate the optical fiber and a second cladding surrounding the first cladding, wherein the second cladding comprises:
        a first fluid;
        a conduit positioned in the second cladding wherein the conduit comprises a second fluid; and
        a translucent portion.

7. A cable system, comprising:
    an optical fiber;
    a first conduit comprising a first fluid coupled to the optical fiber;
    a second conduit comprising a second fluid, wherein the second conduit is postionable within the first conduit; and
    wherein the second conduit allows the first fluid and the second fluid to mix if a portion of the optical fiber has been compromised.

8. The system as recited in claim 7, wherein the second fluid comprises a dye.

9. The system as recited in claim 7, wherein the second fluid comprises an activator.

10. The system as recited in claim 7, wherein the first fluid comprises a fluorophore.

11. The system as recited in claim 7, wherein the first fluid comprises an emitting species or a precursor to an emitting species.

12. The system as recited in claim 7, wherein the first fluid or second fluid comprises a pH indicator.

13. The system as recited in claim 7, wherein the first fluid or second fluid comprises an acidic solution or a basic solution.

14. The system as recited in claim 7, wherein the second conduit is configured to break at a bend radius equal to about the maximum bend radius of the optical fiber.

15. The system as recited in claim 7, wherein the optical fiber is compromised when a portion of the optical cable is bent beyond a maximum bend radius.

16. The system as recited in claim 7, further comprising cladding surrounding the optical fiber, and wherein the first conduit surrounds at least a portion of the cladding.

17. A network system, comprising:
    one or more cables, wherein a cable of the one or more cables comprises:
        a transmission medium;
        a first conduit comprising a first fluid;
        a second conduit comprising a second fluid;
        an indicator configured to be activated if a portion of the cable is compromised resulting in the first fluid and the second fluid mixing; and
    at least two network devices, wherein a first one of the network devices is configured to transmit data to a second one of the network devices over the transmission medium.

18. The system as recited in claim 17, wherein the cable is compromised when a portion of the cable is bent beyond a maximum bend radius.

19. The system as recited in claim 17, wherein the network system comprises a storage area network (SAN), and wherein one of the network devices comprises a storage device.

20. A method comprising:
    monitoring a network system that connects components via a plurality of optical cables, each optical cable including a respective indicator, wherein each indicator is configured to be activated if a portion of its respective cable is compromised, wherein each said indicator is configured to activate upon bending a first conduit of the indicator and breaking a second conduit of the indicator upon application of a force sufficient to bend its respective cable such that a maximum bend radius of the cable is exceeded;
    detecting a transmission error within the network system;
    locating one or more of the optical cables having an activated indicator; and
    replacing the one or more of the optical cables having an activated indicator.

21. The method as recited in claim 20, wherein breaking the second conduit further comprises mixing a fluid from the second conduit with a fluid within the first conduit thereby causing the first fluid or second fluid to change color.

22. A cable, comprising:
    a transmission medium;
    an indicator coupled to the transmission medium; and
    wherein the indicator is activated if a portion of the cable system is subjected to a physical stress condition sufficient to damage the transmission medium;
    wherein the indicator comprises:
        comprising a first fluid; and
        a second conduit comprising a second fluid, wherein the first fluid and the second fluid are allowed to mix if a portion of the cable system is subjected to a physical stress condition sufficient to damage the transmission medium.

* * * * *

UNITED STATES PATENT AND TRADEMARK OFFICE
CERTIFICATE OF CORRECTION

PATENT NO. : 6,798,956 B2
DATED : September 28, 2004
INVENTOR(S) : John M. Morrison It is certified that error appears in the above-identified patent and that said Letters Patent is hereby corrected as shown below:

<u>Column 10,</u>
Line 60, before "comprising a first fluid; and", please insert -- a first conduit --.

Signed and Sealed this

Nineteenth Day of April, 2005

JON W. DUDAS
*Director of the United States Patent and Trademark Office*